United States Patent [19]

Erickson

[11] 4,173,619

[45] Nov. 6, 1979

[54] COMBUSTION GAS DESULFURIZATION

[76] Inventor: Donald C. Erickson, 1704 S. Harbor La., Annapolis, Md. 21401

[21] Appl. No.: 886,596

[22] Filed: Mar. 14, 1978

[51] Int. Cl.² .............................................. B01D 53/34
[52] U.S. Cl. .................................. 423/210.5; 423/242
[58] Field of Search ...................... 423/210, 242, 210.5, 423/563

[56] References Cited

U.S. PATENT DOCUMENTS

| | | | |
|---|---|---|---|
| 3,438,722 | 4/1969 | Heredy et al. | 423/210.5 |
| 3,671,185 | 6/1972 | Francois et al. | 423/210.5 |
| 3,919,390 | 11/1975 | Moore | 423/210.5 |

*Primary Examiner*—Earl C. Thomas

[57] ABSTRACT

Hot combustion gas from a coal or oil fired furnace is desulfurized by a regenerative molten alkali salt process. The process is both highly efficient and uncomplicated. Only three major pieces of equipment are required—scrubber, regenerator, and auxiliary combustor. All reactions are adiabatic, no solids handling is required, only steam is required for salt regeneration, and the regeneration product is $H_2S$. Process temperature is low enough to minimize corrosion by the salt and to permit efficient fly ash removal prior to salt contact. High regeneration efficiency is achieved using only steam optionally mixed with $CO_2$ as regenerant as follows: the combustion gas is maintained slightly reducing which causes the dominant sulfur species in the salt to be the sulfide; the salt cation composition is controlled to yield an acceptably high sulfide concentration in the salt; and salt regeneration is conducted at a significantly higher pressure than scrub.

11 Claims, 1 Drawing Figure

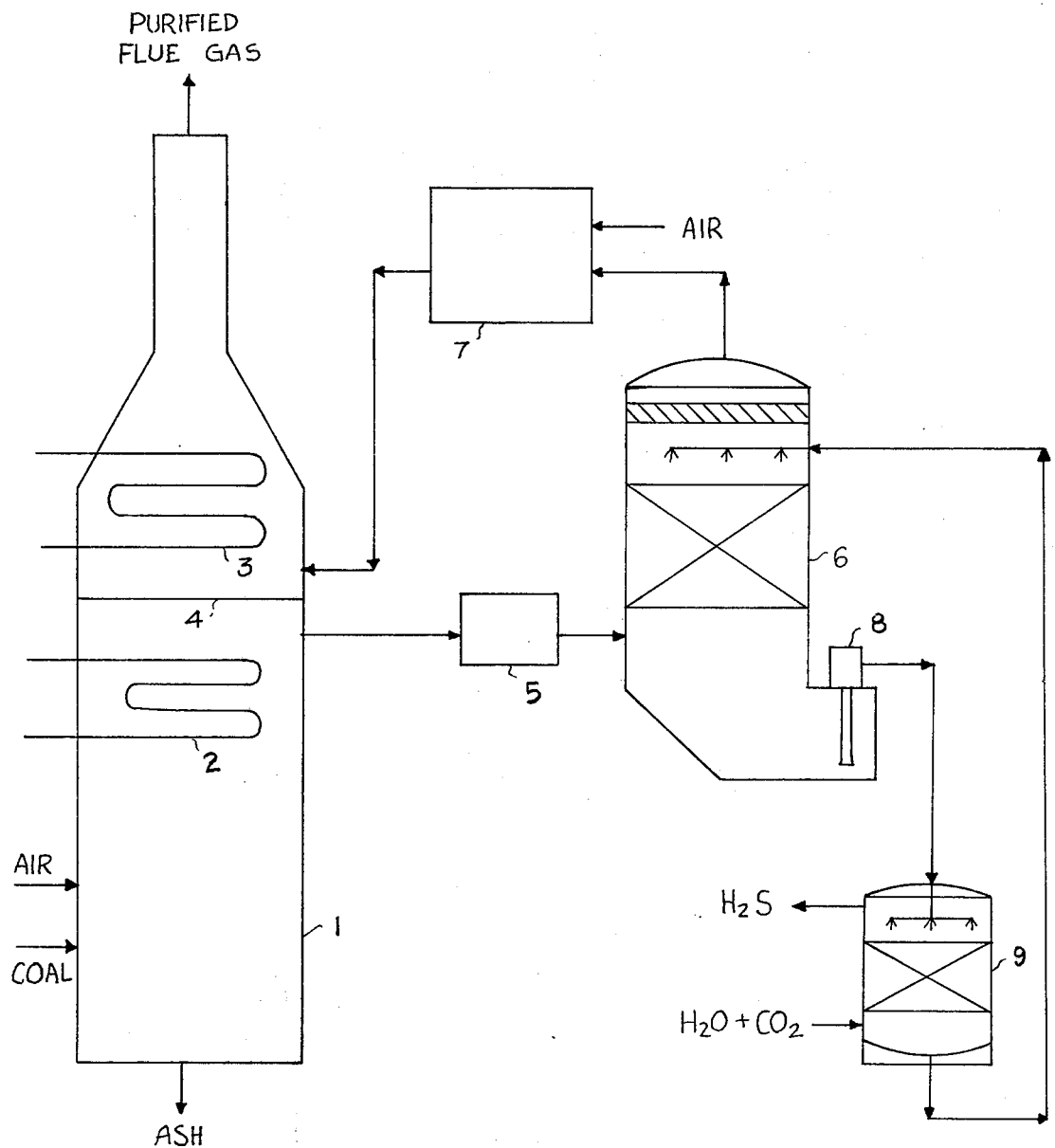

COMBUSTION GAS DESULFURIZATION

BACKGROUND

In recent years two distinct types of processes have been developed for desulfurizing gases by using molten alkali carbonate salt mixtures. One type of process scrubs a fuel gas (also known variously as reducing, synthesis gas, low or medium BTU gas, producer gas, town gas, etc.), whereas the other type of process scrubs a flue gas (also known as stack gas). Both types of processes are regenerative, i.e. there is no net consumption of alkali salt, and the sulfur ends up in salable form: elemental sulfur or sulfuric acid. Each type of process however entails characteristic disadvantages which have mitigated against their use as the desulfurization mechanism of conventional fossil fuel fired furnaces, e.g. electric utility boilers which burn coal, residual oil, and similar sulfurous carbonaceous fuels.

The flue gas approach is described in a series of U.S. patents assigned to and reports issued by Atomics International, including U.S. Pat. Nos. 3,438,722, 3,438,728, 3,551,108, 3,574,545, and the reports issued under EPA contract CPA 70-78 entitled "Development of a Molten Carbonate Process for Removal of $SO_2$ from Power Plant Stack Gases". In essence the process is a three step process: $SO_2$ in the flue gas reacts with the salt to form alkali sulfates plus minor amounts of sulfites; the sulfate in the salt is reduced to alkali sulfide by a reducing gas; and finally the sulfide is regenerated to carbonate by reaction with steam and $CO_2$. The salt reduction step is incorporated because direct regeneration of a sulfate/sulfite salt by $CO_2$ plus steam is thermodynamically extremely inefficient, compared to regeneration of sulfide salt. However, the salt reduction step has been found to also be highly inefficient, for a combination of reasons. First, there is a low utilization of the reducing gas—equilibrium considerations dictate that there will be a high $H_2$ plus CO concentration in the exhaust reducing gas exiting the reductor, plus a troublesome amount of $H_2S$. Secondly, the regenerated salt characteristically contains an appreciable residue of sulfide—otherwise the regeneration would unavoidable be highly inefficient. This sulfide reacts with excess $O_2$ in the flue gas to form sulfate, and that sulfate creates a demand for additional reducing gas. Thus this approach to desulfurization has never achieved commercial success due both to the high capital costs associated with the multiple step processing sequence and also due to the excessively high requirement for reducing gas or equivalent reducing agent (coke, electricity, etc.). U.S. Pat. No. 3,671,185 discloses a similar flue gas absorption step, but requires undesirably high temperatures, and also incorporates a solid phase salt regeneration process which is quite complex and inefficient.

The molten alkali carbonate salt approach to desulfurizing fuel gases is described in U.S. Pat. Nos. 3,919,390 and 3,996,335, and a series of reports by Battelle Pacific Northwest Laboratories entitled "Process for Removal of Sulfur Compounds from Low BTU Fuel Gases" including OCR (Office of Coal Research) R&D Report 100. The advantage of scrubbing a fuel gas vice flue gas is that alkali sulfide is formed directly during the scrubbing step. Thus no separate salt reduction step is necessary; the sulfide containing salt from the scrubber (also called absorber) can be sent directly to the regenerator. Regeneration of the sulfide to carbonate is accomplished by reaction with steam plus $CO_2$ similarly to the corresponding step of the flue gas processes. The first intensive investigation of this regeneration step indicated that it would evidence a low efficiency (i.e. consume excessive amounts of steam plus $CO_2$ per unit of $H_2S$ scrubbed). However several recent disclosures have revealed methods of markedly increasing the regeneration efficiency for a given level of desulfurization. OCR R&D 100 discloses lowering the temperature of the salt prior to regeneration. Copending application 867,323 filed on Jan. 5, 1978 discloses use of countercurrent multistaging for both scrub and regeneration. By incorporating one or more of these techniques for increasing regeneration efficiency, it is now possible to regeneratively desulfurize a high temperature fuel gas both efficiently and economically. This capability however does not solve the needs of existing coal or oil fired furnaces. These furnaces incorporate the means for injecting and combusting the coal integrally with the boiler and related heat exchangers. Although it would be possible to add a separate fuel gas generator, desulfurize the fuel gas, and then inject the clean fuel gas into the boiler combustion zone, this would fail to utilize the existing coal firing capability while at the same time requiring the addition of an expensive fuel gas generator having its own coal firing capability. Such a solution appears marginal at best for existing furnaces, as distinct from new construction.

Another reason the existing molten alkali carbonate processes for fuel gas desulfurization do not meet the desulfurization needs of existing coal-fired boilers is that they must operate at relatively high temperatures, e.g. above approximately 1200° F. Fuel gases contain high proportions of CO and high $pCO/pCO_2$ ratios; thus cooling to that vicinity or lower can result in carbon deposition from the reverse Bouduard reaction. For fuel gas desulfurization processes there is a thermal efficiency advantage in operating at a temperature as close to the fuel gas generator temperature as possible, e.g. 1300° to 1600° F. However it would be very difficult to extract boiler flue gas in that temperature range, and other penalties would accrue even if it were done.

The term "combustion gas" as used herein encompasses both flue gas and fuel gas, i.e. it refers to the gas resulting from combustion (oxidation) of carbonaceous fuels regardless of the degree of completion of combustion.

SUMMARY OF THE PROCESS

In order to meet the desulfurization needs of existing coal fired boilers, a molten alkali carbonate process should have particular attributes from each of the two current salt scrubbing processes—it should be capable of scrubbing the relatively low temperature, highly combusted gas exiting from the boiler, but it should also have the more efficient and simpler regeneration that is possible only with the fuel gas desulfurization process. It has been found that there is a narrow and critical band of operation wherein it is possible to achieve both of these attributes. The key discoveries are that there is a certain low melting point salt composition for which a gas only has to be slightly reducing in order to obtain predominantly alkali sulfides vice sulfates from the scrubbing step, that such a gas can be exhausted from existing boilers with minimal changes, and that the CO content of such a gas is low enough to avoid the carbon deposition problem. The process requires that at least five parameters be maintained within narrow, well defined ranges. However, those ranges correspond very nicely to operating conditions encountered in coal boilers. By adhering to the prescribed operating conditions, a reasonably simple process and system are achieved, thereby enhancing reliability, coupled with unparalleled efficiency and economy.

BRIEF DESCRIPTION OF THE DRAWING

The FIGURE is a schematic illustration of the relationship of major process equipment in one preferred embodiment of the process. The coal or oil fired furnace 1 is fitted with a flow diverting device 4 at a point between heat exchanger sections 2 and 3 where the combustion gas is at the desired temperature. Particulate matter is removed from the combustion gas in means for particulate removal 5, for example an electrostatic precipitator. Then the combustion gas is routed through the scrub column 6 countercurrently to the spray of scrub salt. The desulfurized or scrubbed combustion gas is then oxidized with additional air to complete its combustion in auxiliary combustor 7. The hot clean completely combusted gas is returned to furnace 1 downstream from divertor 4 to undergo additional heat exchange and final exhaust. Sulfide laden salt from scrubber 6 is increased in pressure by pump 8 and sprayed into regeneration column 9, where it is countercurrently contacted with regeneration gas comprised of steam optionally mixed with $CO_2$. The $H_2S$ bearing exhaust regeneration gas is routed to a conventional means for sulfur recovery, and the regenerated salt is reduced in pressure and recycled to scrubber 6.

THERMODYNAMIC ASPECTS OF THE PROCESS

The major reaction occurring between the salt and both the scrub and regeneration gases is represented by the stoichiometry:

$$M_2CO_3 + H_2S = M_2S + H_2O + CO_2 \quad (1)$$

where M signifies the mixture of alkali cations - potassium, lithium and optionally also sodium. This reaction proceeds left to right during scrub and right to left during salt regeneration. There are numerous additional reaction stoichiometries which are present in the complex chemical equilibrium which is approached by the salt and each gas, which, although they occur to lesser extents than reaction (1), are in some cases quite important. These include $$2MOH + H_2S = M_2S + 2H_2O \quad (2)$$

$$M_2CO_3 + H_2O = 2MOH + CO_2 \quad (3)$$

$$CO + H_2O = CO_2 + H_2 \quad (4)$$

$$M_2CO_3 + H_2 = 2MOH + CO \quad (5)$$

$$M_2S + 3H_2O = M_2SO_3 + 3H_2 \quad (6)$$

$$M_2S + 4H_2O = M_2SO_4 + 4H_2 \quad (7)$$

$$M_2SO_3 + H_2O = M_2SO_4 + H_2 \quad (8)$$

$$H_2S + 2H_2O = SO_2 + 3H_2 \quad (9)$$

$$M_2S + 4CO_2 = M_2SO_4 + 4CO \quad (10)$$

Note that reaction (3) is sum of reactions (1) and (2), reaction (5) is the sum of reactions (3) and (4), reaction (8) is the sum of reactions (6) and (7), and reaction (10) is the sum of reactions (4) and (7). Thus reactions (3), (5), (8), and (10) need not be considered when calculating equilibrium; nevertheless they provide valuable insights into the overall process. The contribution of each of the above reactions to the overall process will vary with process conditions. Thus it is the task of the process designer to choose those process conditions which will maximize the contribution from the desirable reactions and minimize the contribution from the undesirable ones. Alkali salt solutions similar to that employed in this process have been shown in numerous prior art studies to behave ideally and to have rapid kinetics such that equilibrium is very closely approached; therefore known techniques of equilibrium analysis are applicable to this system. The choice of salt cation mixture will determine the relative amounts of $M_2CO_3$, $M_2S$, MOH, $M_2SO_4$, and $M_2SO_3$ in the salt, other conditions remaining the same. For example, $K_2S$ is more stable than $Li_2S$ (i.e. has a more negative $\Delta G$ of formation). Therefore increasing the $K^+$ and decreasing the $Li^+$ content of the salt will cause the $M_2S$ concentration of the salt to increase when in equilibrium with a given $pH_2S$. On the other hand, LiOH is more stable than either NaOH or KOH, thus increasing $Li^+$ content will increase the hydroxide concentration in the salt.

The relative contributions of reactions (1) and (2) to the overall scrubbing and regeneration reactions are determined by the proportions of carbonate and hydroxide in the melt, and by the proportion of $CO_2$ in the regeneration gas. When the $CO_2$ proportion is high, e.g. 1/3 or more, most of the scrubbing is done by reaction (1). When the $CO_2$ proportion of the regeneration gas is small or zero, reaction (3) will exchange $CO_2$ for steam in the regeneration gas, such that even then both reactions (1) and (2) will contribute substantially. This $CO_2$—$H_2O$ exchange is enhanced by increased hydroxide concentration, i.e. by salts with higher Li content.

Those reactions which have the same number of moles of gas on each side of the equation are essentially unaffected by pressure changes. All other reaction equilibria will be displaced toward the side having fewer moles of gas by a pressure increase. In particular, reactions (1) and (2) are sensitive to pressure. In general, molten alkali salt scrubbing processes can operate over a wide range of pressures by varying either the sulfide concentration or the cation composition to counteract the pressure effect. When the pressure of a given gas-salt mixture at equilibrium is increased, the net effect is to increase the $H_2S$ concentration is the gas and decrease the $M_2S$ concentration in the salt. This effect can be utilized to increase the salt regeneration efficiency for a given set of scrubbing conditions by conducting the regeneration reaction at a significantly higher pressure than the scrub reaction.

Temperature changes cause the equilibrium constant to change, and in principle that effect can also be used to increase regeneration efficiency for a given set of scrub conditions, i.e. by conducting regeneration at a lower temperature than scrub.

The advantages obtainable from countercurrent multistaging of both the scrub and regeneration reactions are discussed in the referenced copending application - that is another means of increasing regeneration efficiency for a given set of scrub conditions. Multistaging also allows reaction (3) to occur to a greater extent, thereby reducing the amount of regeneration $CO_2$ necessary to achieve a given level of regeneration efficiency.

The salt exiting the scrubber has the highest $M_2S$ concentration, and that exiting the regenerator has the lowest $M_2S$ concentration. If scrubbing is accomplished in a single stage, the maximum $M_2S$ concentration is determined by the $H_2S$ level in the scrubbed combustion gas. If additional countercurrent scrub stages are added, then the maximum $M_2S$ increases, but it can never exceed the $M_2S$ level in equilibrium with the incoming $H_2S$.

The at constant of reaction (8) is approximately 1 at process conditions. This reveals that the ratio of sulfite to sulfate in the salt will be approximately equal to the ratio of $H_2$ to $H_2O$ in the combustion gas. The latter ratio is on the order of 1 to 20; hence the sulfite content of the salt employed in this process will be quite small compared to the sulfate content, which in turn is intentionally kept less than the sulfide content, as explained subsequently.

ENGINEERING ASPECTS OF THE PROCESS

A typical bituminous coal having 4 weight percent sulfur will be found by ultimate analysis to contain approximately 0.8 hydrogen atoms and 0.02 sulfur atoms per carbon atom (MAF). Such a coal will require approximately 1.22 molecules of oxygen or 6 molecules of air per carbon atom for complete combustion to $CO_2$, $H_2O$, and $SO_2$. If less than stoichiometric air is supplied, the combustion gas will contain significant amounts of CO and $H_2$. For example, if only 96% of the stoichiometric air is supplied, then the ratio $$\frac{pCO + pH_2}{pCO + pCO_2 + pH_2 + pH_2O} = \frac{quality}{100}$$

will be 0.067. This ratio, expressed as a percentage (i.e. 6.7%), is termed the "quality" of a combustion gas, and is a useful measure of both the chemical energy content and the reducing capability of the gas. The greater the air deficiency, the higher the quality. The quality of most types of fuel gas is normally in excess of 50%.

The CO which is present in a combustion gas with nonzero quality requires special consideration. It can decompose to carbon/soot according to the reverse Bouduard reaction $$2CO(g) \rightarrow C(b) + CO_2(g)$$

The temperature at which this reaction proceeds is the reverse Bouduard temperature, a calculable function of pCO and $pCO_2$; in general, temperatures in excess of 1600° F. preclude its occurrence, whereas at temperatures below 1100° F., it can occur even when only small amounts of CO are present.

Consider the combustion gas resulting from burning the coal cited above in 96% stoichiometric air. The approximate composition of the gas will be:

| | |
|---|---|
| 15.6% | $CO_2$ |
| 1.1 | CO |
| 6.1 | $H_2O$ |
| 0.44 | $H_2$ |
| 0.33 | $H_2S$ |
| balance | $N_2$ |

When this gas is at a pressure of 1 atmosphere, the reverse Bouduard reaction will proceed at temperatures below 733 K, i.e. carbon will be deposited on any surfaces the gas contacts which are cooler than that temperature.

Note that the sulfur species present in this combustion gas is $H_2S$. Although $SO_2$ and $SO_3$ are the major sulfur species present in completely combusted gas, only a slight increase in the combustion gas quality will markedly change the composition to $H_2S$. For example, a combustion gas of only 1% quality will have more than 90% of the sulfur species present as $H_2S$ at equilibrium. As disclosed in the prior art, there will be minor amounts of other sulfur compounds such as COS and $SO_2$ in the gas, which are also scrubbed.

This process requires that the major product of the chemical reactions in the scrubber be molten alkali sulfide rather than sulfate. The reason for this is the substantially higher regeneration efficiency which can be achieved with sulfides compared to sulfates—the sulfate regeneration reaction is not improved by higher pressure, whereas the sulfide regeneration reaction is markedly improved by high pressure. In order to achieve sulfide scrubbing, it has been found that it is necessary to maintain at least three major interrelated variables all within narrowly defined limits. The quality of the combustion gas must be high enough to cause sulfides to predominate over sulfates yet low enough to preclude reverse Bouduard. The temperature must be low enough to minimize corrosion by the salt, to allow efficient particulate removal before scrub, and to match conditions found in the boiler, while being high enough to maintain the salt molten, prevent carbon deposition, and maintain a sufficient sulfide concentration in the salt. The salt cation composition must yield an appropriate melting point and must also cause the salt sulfide concentration to remain sufficiently high at the scrubber temperature and pressure. Each of these will be discussed, including the additional considerations arising owing to regeneration, auxiliary combustion, and the method of obtaining the required combustion gas quality.

The determining factor in whether the major scrubbing product will be alkali sulfide or sulfate is the quality of the combustion gas being scrubbed. The effect can be analyzed by considering reaction (7) or (10). The ratio of sulfide in the salt to sulfate in the salt, $a(M_2S)/a(M_2SO_4)$, is directly proportional to the fourth power of the $pH_2/pH_2O$ ratio, and the latter ratio is directly relatable to the quality.

The table shows the combustion gas quality resulting from varying degrees of combustion air deficiency, and also shows the effect of quality on the ratio of sulfide salt to sulfate salt and on the temperature at which carbon deposition occurs. As can be seen in that table, the salt sulfur species are more than 50% sulfides for qualities above 2%, and are more than 80% sulfides for qualities above 5%. However for qualities above 20% the carbon deposition temperature exceeds 800 K. Thus a combustion gas quality in the approximate range of 2% to 20% is required, preferably 4 to 8%.

In addition to the sulfide being the dominant sulfur species in the salt, it is also necessary that the sulfide be a significant fraction of the overall salt composition. There are two reasons for this, one related to the required salt circulation rate and one related to regeneration efficiency. The salt exiting the regenerator has the lowest sulfide loading, and that exiting the scrubber has the highest sulfide loading. In order to scrub the combustion gas to the desired low level of sulfur content, the regenerated salt must have a sulfide content less than the sulfide content of a salt which is in equilibrium with the scrubbed gas. For example, consider the combustion gas composition cited above. For that gas to meet sulfur emission regulations after completion of combustion it is necessary that 80% of the sulfur compounds be removed. Thus after scrubbing the H$_2$S percentage must be reduced to 0.33/5=0.066%. The equilibrium constant expression for reaction (1) reveals the salt sulfide concentration which is in equilibrium with the clean gas:

$$\frac{aM_2S}{aM_2CO_3} = K_{(1)} \frac{pH_2S}{pH_2O \, pCO_2} =$$

$$K_{(1)} \frac{.066}{15.6 \times 6.1} = 0.069 e^{-\frac{\Delta G^\circ}{RT}}$$

The value of $aM_2CO_3$ varies over the approximate range 0.9±0.1. Thus for $K_{(1)}=1$, $aM_2S$ will be 0.062, i.e. M$_2$S will be 6.2% of the salt, whereas for $K_{(1)}=0.1$, M$_2$S will be only 0.62% of the salt.

This value of M$_2$S content of the salt in equilibrium with the scrubbed combustion gas is significant in two ways. First, the M$_2$S content of the regenerated salt must be lower than that value by a certain increment dependent on the number of scrub stages and the salt circulation rate. As the scrubbed gas M$_2$S becomes small, the increment represents a bigger fractional change in M$_2$S content, and the regeneration efficiency correspondingly degrades. If more than 80% sulfur is scrubbed, this effect is correspondingly greater. Secondly, the M$_2$S content of the salt exiting the scrubber is always less than 5 times the scrubbed gas M$_2$S (i.e. the M$_2$S level corresponding to equilibrium with the incoming combustion gas). If the scrub salt M$_2$S is too small, then an excessive amount of salt must be circulated per mole of H$_2$S scrubbed. To summarize, a sulfide loading in excess of 5% out of the scrubber and in excess of .2% out of the regenerator are desirable during operation, and this can be achieved if $K_{(1)}$ is 0.2 or greater.

The above considerations show that a $K_{(1)}$ of approximately 0.2 or greater is necessary for this process to operate effectively. This is achieved by establishing and maintaining the cation composition of the salt. Note that in the initial salt charge and in any makeup amounts of salt added during operation, it is only necessary to control the cation composition—the anion composition is inherently established by the chemical reactions which occur in the salt during operation. Thus the cation composition must be chosen so as to both keep the salt molten at operating conditions and also to maintain a satisfactorily high concentration of sulfide in the salt, which requires that $K_{(1)}$ be approximately 0.2 or greater.

At the higher temperatures, e.g. 950 K, this is easily achieved, as there are a wide range of salt compositions which are molten at this temperature and most of them, excepting those with Li contents greater than 60%, yield a $K_{(1)}$ greater than 0.2. For example, K+ of 40±20%, Li+ of 35±25%, and balance Na+, will all satisfy the above criteria. As temperature decreases, the available molten compositions decrease, and the salt compositions having acceptable $K_{(1)}$ values even more markedly decrease. At 850 K, two compositions which are suitably molten (m.p. below 800 K) and have $K_{(1)}$ of approximately 0.2 are:

(a) 40% K+, 30% Na+, 30% Li+

(b) 60% K+, 40% Li+ plus also any combination of the two, such as 50% K+, 15% Na+, and 35% Li+.

At the expense of a slightly higher melting point, $K_{(1)}$ of any of the above can be increased to 0.3 by decreasing Li+ by 5% and correspondingly increasing K+ and/or Na+. In summary, for 850 K operation, the salt should contain approximately 50±10% K+, 30±10% Li+, balance Na+.

Understandably other impurity cations will tend to collect in the salt during long term operation. By controlling them to no greater than approximately 10%, neither the melting point nor the sulfide loading (i.e. $K_{(1)}$) will be significantly adversely affected. This can be accomplished by periodic withdrawal and using known means of purification. One major objective of incorporating a high efficiency particulate removal device before the scrubber is to minimize the need for this type of purification and its attendant salt losses.

| percent stoichiometric air | gas quality (%) | $\frac{aM_2S}{aM_2SO_4}$ | reverse Bouduard temperature |
|---|---|---|---|
| 99 | 1.7 | 0.1 | 665 K |
| 98 | 3.4 | 1.3 | 697 |
| 97 | 5.1 | 7.1 | 718 |
| 96 | 6.7 | 24.1 | 733 |
| 95 | 8.6 | 63.4 | 746 |
| 94 | 10.3 | 141.8 | 757 |
| 93 | 12.0 | 283.8 | 767 |
| 90 | 17.1 | 1500 | 792 |
| 80 | 34.3 |  | 853 |

As shown, both carbon deposition problems and salt limitations (both melting point and sulfide loading) require that the scrubber temperature be above approximately 800 K. On the other hand, boiler considerations, equipment corrosion considerations, and particulate removal considerations all require the temperature to be kept as low as possible. Regarding corrosion, OCR R&D Report 100 reports that several alonized stainless steels are capable of withstanding the corrosive effects of salts similar to the one used in this process at temperatures up to 1025 K. BNWL "(Battelle Pacific Northwest Laboratories)" is currently operating a pilot plant employing such a salt at 975 K and using alonized SS. At the preferred temperature of this process, 850 K, Atomics International Report AI-70-7 reports experimental data which indicates that several untreated specialty alloys, including Haynes 25 and SS347 will be acceptable. Thus the temperature range specified for this process, 800 K to 950 K, is low enough to satisfy the objective of minimizing salt corrosion to acceptable levels. Importantly, this allows the use of pumps for salt circulation and high efficiency, low pressure drop spray towers for absorption. Also, this temperature range precludes any significant loss of salt in the vapor phase. Conventional disentrainment apparatus is advantageously applied to limit liquid phase salt loss. Alonized SS is a stainless steel which has had a diffusion layer of aluminum added at the surface by the alonizing process of ALON Processing Inc., Tarentum, PA., or other equivalent processes. Haynes 25 is a heat resistant alloy from Union Carbide Co. of nominal composition 52% cobalt, 20% chrome, 15% tungsten, 10% nickel, and 3% iron. SS 347 is an abbreviation for AI2I Type 347 steel.

The precise manner in which the combustion gas achieves its requisite quality is immaterial with respect to operation of the scrubber and auxiliary combustor. However it may be important with respect to overall economics of the process - thus it is advantageous that a variety of methods can be employed. The simplest and ostensibly most economical method is to reduce the air-fuel ratio to the boiler as indicated in the table, i.e. maintain reducing conditions throughout the furnace. However there are at least two potential problems— there may be excessive soot formation on cold walls, and the reduced sulfate content of the flyash may adversely impact electrostatic precipitator operation. Where these or similar problems can be overcome, this is the preferred method of quality adjustment. Otherwise it will be necessary to inject a small amount of fuel or fuel gas directly into the combustion gas before it enters the scrubber. The amount is readily calculable— for example if it is desired to raise the quality of a combustion gas from 0 (no excess air) to 5%, and to do it by injecting 80% quality fuel gas, then the molar proportions of combustion gas to fuel gas will be 80 to 16 to 1. Clearly a separate fuel gas generator could be used for this purpose. On some furnaces there is a fuel "rich" combustion zone in which the fuel is partially oxidized followed by a "leaner" combustion zone in which oxidation is completed. This technique has the advantage of limiting maximum flame temperature and limiting $NO_x$ formation. In such furnaces the fuel rich combustion zone would be a very attractive source for the small amount of fuel gas necessary for quality adjustment. It is important to note that this fuel gas requirement is not an energy expense of this process—the fuel gas remains in the combustion gas, it is completely combusted in the auxiliary combustor, and thus essentially all the energy is delivered back to the boiler.

The preceding examples of quality adjustment techniques did not entail temperature adjustment of the combustion gas. However this also is possible, and yields yet another advantageous embodiment of the process. Rather than extract the combustion gas from the boiler at approximately the same temperature as the scrubber, e.g. 1070° F., the combustion gas can be substantially further cooled, and then have additional fuel gas plus air combusted into it prior to scrub to raise its temperature to the scrub temperature. For example, if 10% fuel gas of 80% quality is added to the combustion gas vice the 6% in the preceding example, plus sufficient air to completely combust the extra 4%, then the combustion gas temperature would be increased by approximately 350° F. Thus the combustion gas can be extracted from the boiler at 720° F. vice 1070° F., and the electrostatic precipitator or other particulate removal device benefits from lower temperature operation. Although some electrostatic precipitators are available which operate to 1070° F., as detailed in Electric Power Research Institute Report 243-1, most are designed for temperatures of 750° F. or lower. Other known means of increasing the temperature of the gas exiting the means for particulate removal can also be employed, for example heat exchange against the hot gas exiting the auxiliary combustor.

The scrubber in this process can embody any of the conventional means of gas-liquid contact—for example spray towers, packed columns, bubble columns, and the like, or even injecting the gas into a pool of melt through a lance or equivalent. Particularly preferred are those devices which entail a low pressure drop of the gas and also which allow some degree of turndown. Multistage conuntercurrent scrubbing is highly preferred as it reduces the required salt circulation rate between scrubber and regenerator, and also results in higher regeneration efficiencies when combined with multistage countercurrent regeneration. Due to the high volumetric flow rate of combustion gas through the scrubber, one or more salt recycle streams will normally be employed in column type scrubbers in order to maintain efficient gas-salt contact.

It is normal practice to incorporate induced draft fans in apparatus such that in this desulfurization process, in order to maintain balanced flow and approximately equal pressures. Since the sulfide loading of the salt is increased by lower pressure, it is preferred to locate the ID fan downstream of the scrubber when it is used.

The regeneration step of this process very importantly incorporates several techniques of enhancing the overall regeneration efficiency. Given a scrubbing step which is scrubbing a given combustion gas to a specified level of residual sulfur content, there are at least five ways to increase the regeneration efficiency, i.e. to decrease the number of moles of $H_2O$ and $CO_2$ necessary to scrub 1 mole of $H_2S$ out of the gas. In order to be economically viable, a regenerative desulfurization process must require no more than approximately 15 moles of steam plus $CO_2$ per mole of $H_2S$ scrubbed, and preferably no more than 8. The stoichiometric limit is 2 moles per mole $H_2S$, which of course cannot be attained in actual practice.

The methods available to increase regeneration efficiency (given specified scrub results) are as follows:
(a) increase salt circulation rate between scrubber and regenerator
(b) increase $CO_2$ fraction of regeneration gas up to a maximum of approximately 0.5.
(c) conduct both scrub and regeneration in multiple countercurrent stages.
(d) conduct regeneration at a lower temperature than scrub.
(e) conduct regeneration at a higher pressure than scrub.

Most frequently a combination of the above techniques will be employed in order to economically achieve a desired level of regeneration efficiency. In this process particularly, wherein the salt sulfide loading is characteristically low, it is important to use both multistaging and pressure swing in order to achieve advantageous regeneration efficiencies.

Whereas a regeneration gas with 50% $CO_2$ may yield the most efficient regeneration, it is usually not the most economical regeneration, since $CO_2$ is normally more expensive to obtain than steam. Thus the actual $CO_2$ fraction used will vary widely with process conditions, for example whether or not the waste gas from a $CO_2$ scrubber is already available at the complex. The low temperature range of this process and the low Li cation content of the salt result in a low hydroxide anion content of the salt, and therefore reaction (3) occurs only to a limited extent. Thus although in principle this process will work on steam alone as the regeneration gas, in practice the regeneration gas will normally contain 5 to 60% $CO_2$, most frequently 10 to 40%.

The temperature swing technique finds limited or no application in this process. This is because the scrubbing reaction is advantageously conducted as close to the melting temperature of the salt as it is prudent to approach, and therefor no significant amount of additional cooling is available for regeneration. This is no detriment, since the temperature swing technique involves some severe penalties in the areas of thermal losses and added equipment, and also any efficiency gains available from temperature swing are also readily obtainable by pressure swing. One aspect of regenerator temperature is worthy of consideration however. The scrubbing reaction is endothermic and the regeneration reaction is equally exothermic. The molar flow rate of combustion gas is typically twenty times the molar rate of regeneration gas. With the large volume of combustion gas available to supply the endothermic heat of reaction, there is no noticable cooling in the scrubber. In the regenerator however, if the regeneration gas is injected at scrubber temperature, there will be a temperature rise on the order of 50°–100° F. as the salt transits the regenerator. This increase is undesirable since it decreases regeneration efficiency (i.e. opposite of technique (d) above). Thus it is desirable to introduce the regeneration gas at a substantially cooler temperature, to offset this heating effect. As disclosed in the prior art, it is even possible to inject some or all of the regeneration $H_2O$ in liquid phase in order to achieve the desired cooling effect.

The pressure swing technique is by far the most significant and substantial contributor to the overall regeneration efficiency achievable by this process. With neither pressure swing or multistaging, the regeneration efficiency is inherently limited by the $M_2S$ content of the salt in equilibrium with the clean combustion gas. By incorporating multistaging, the inherent limit is increased, but is still limited by the $M_2S$ content of a salt in equilibrium with the incoming combustion gas. With pressure swing, neither of these limits applies any longer, whether or not multistaging is present. Of course by keeping multistaging, the pressure necessary to achieve a given level of scrub efficiency is substantially reduced, and thus multistaging will normally accompany pressure swing.

The advantages to molten salt desulfurization processes of pressure swing, i.e. of dual pressure operation, have not been heretofore recognized or publicly disclosed. The assertion has previously been made that if the operating pressure of a molten salt desulfurization process is increased, then the scrub reaction will become less effective and the regeneration reaction will become more effective. That assertion has always been followed by the correct conclusion that the two effects essentially cancel one another out, i.e. there is neither a net improvement nor a net degradation in the overall process when the operating pressure is changed. It is instructive to consider how this result comes about.

Consider a constant pressure desulfurization process which is operating at steady state conditions. The scrubbed gas will be exiting the scrubber with a certain steady $H_2S$ fraction, and similarly the regeneration gas will be exiting the regenerator also containing a fixed fraction of $H_2S$. If the pressure of this process were suddenly doubled, the following would happen. The immediate response would be that the fraction of $H_2S$ in both the exiting clean gas and exiting regeneration gas would double, as indicated by reaction (1). (Note that the total pressure of each gas also doubles; thus for the $H_2S$ fraction to double, the $pH_2S$ actually increases by a factor of 4.) This is the condition that is referred to as "less effective scrub and more effective regeneration". However it is important to note that it is only a transient condition. Compared to the steady state operation in effect just prior to the pressure change, the scrubber is now removing less $H_2S$ from the combustion gas and delivering it to the salt as $M_2S$, whereas the regenerator is now removing more $M_2S$ from the salt and delivering it as $H_2S$ to the regeneration gas. At steady state, it was necessary that all $M_2S$ added in the scrubber be removed in the regenerator. Immediately after the change, less is being added and more is being removed, hence a steady decrease in overall salt $M_2S$ results. This decrease is accompanied by a directly proportional decrease in $pH_2S$ in both the scrubber and regenerator. Thus the immediate effect cited above is slowly counteracted—the $H_2S$ fractions in both the scrubber and regenerator slowly decline toward their original values. Steady state will be reestablished, i.e. the overall $M_2S$ content of the salt will stop declining, only when the $H_2S$ fractions in the respective scrub and regeneration regions are back to their approximate original values. Hence the correctness of the conclusion that there is no net change in process effectiveness once the transient is over; the only net change is a decrease in salt sulfide loading.

One additional point to consider when analyzing the effects of pressure changes is just how low the pressure increase causes the sulfide loading to go. As mentioned earlier, when the sulfide loading gets very small, then small incremental changes in sulfide loading will cause large fractional changes in $pH_2S$ equilibrium. In other words, if the pressure increase causes the sulfide loading to become excessively small, then there will be a net overall decrease in process effectiveness. However it is important to recognize that this effect can be counteracted by changing the salt cation composition to one having higher sulfur affinity, thereby restoring the original sulfide loading levels (provided melting point considerations allow this).

The new discovery here disclosed is that a marked net overall improvement in process effectiveness can be achieved by operating the regenerator at a significantly higher pressure than the scrubber pressure. To illustrate this, consider again the above example, wherein the process initially is operating at steady state with essentially the same pressure in both scrubber and regenerator. If the pressure of the regenerator only is doubled, the immediate change will be that the $H_2S$ fraction in the regenerator doubles whereas the $H_2S$ fraction in the scrubber remains the same. Once again however this is only a transient result, as now the same amount of $M_2S$ is being added in the scrubber but twice as much is being removed in the regenerator. The correct response to this transient would be to cut the regeneration gas flow approximately in half, thereby restoring the $M_2S$ balance, i.e. restoring steady state. Thus the net advantage achieved is that only approximately half as much regeneration gas is required to scrub the combustion gas to a given level of cleanliness, compared to the constant pressure case. That is, the regeneration efficiency has been approximately doubled.

The above advantages obtainable from dual pressure operation only apply to sufide salt regeneration, i.e. the sulfate salt regeneration reaction is not improved by pressure change. Thus the advantage is only obtainable when scrubbing a combustion gas of 2% quality or greater. This of course includes all the gases known as fuel gas. Also, the advantage is obtainable when using any of the alkali cations, e.g. sodium, potassium, lithium, or any mixture thereof. The only limitation on choice of cation is that the salt be molten at process temperature.

For higher temperature scrubbing processes, when corrosion considerations preclude using conventional pumps to increase the salt pressure prior to regeneration, other means for increasing the pressure can be used. One method is to operate in batch mode, keeping the salt in a single container, and cycling the pressure in the container as appropriate by the gases being injected into and discharged from it. Another method would be to use the venerable blow case pump, which can easily be protected from corrosion. Thus this pressure swing or dual pressure technique finds wide application beyond the limited combustion gas application described in the remainder of this disclosure. As mentioned earlier, the molar flow rate of regeneration gas is approximately 1/20 of the combustion gas molar flow rate. The higher pressure of the regeneration gas causes the volumetric flow rate of regeneration gas to be more than two orders of magnitude smaller than combustion gas flow. Thus the regeneration column in this process will be markedly smaller than the scrubber. One effect of this size difference is that there will normally be more stages in the regenerator than in the scrubber. Standard McCabe Thiele analysis techniques will reveal the preferred number of countercurrent extraction stages in both the scrubber and regenerator, which will normally be in the approximate range of 2 to 20.

There are two important reasons to incorporate an auxiliary combustor, downstream of the scrubber prior to discharge of the combustion gas to atmosphere in this process. The chemical energy content of the clean combustion gas represents on the order of 4 to 10% of the total energy input to the boiler, and is recovered (i.e. converted to thermal energy) by combustion in the auxiliary combustor. Secondly, whereas the sulfur content of the cleaned combustion gas is below emission specifications, it is still in the form of $H_2S$. Thus the exhaust gas odor will be highly objectionable unless it is oxidized to $SO_2$.

Depending on the exact quality of the combustion gas, the adiabatic temperature rise which will occur when it undergoes complete combustion is between 200° and 600° F., for example 400° F. for a 5% quality gas. Thus the adiabatic auxiliary combustor will operate at approximately 1500° F. This is marginally below the assured ignition temperature of the very low BTU combustion gas, thus incorporation of a catalytic ignition agent is advantageous. Alternatively it is possible to heat exchange the gas entering the auxiliary combustor against the hotter gas exiting it to raise its operating temperature.

Another advantageous method of conducting the auxiliary combustion is to use molten alkali carbonate salt. Air injection is used to keep the dominant sulfur species in the salt the sulfate vice sulfide, and the sulfate completely oxidizes the combustion gas. In essence the salt is a very good catalyst. The air and combustion gas can be injected into the salt either separately or jointly. Due to the higher salt temperature, it is not necessary to maintain lithium cations in the salt to keep it molten. Any combination of sodium and/or potassium cations can be used. The higher temperature indicates that simple pool type injection in a refractory lined vessel should be used, as pumps and columns would experience excessive corrosion.

The hot gas exhausting from the auxiliary combustor can be rerouted to the boiler or to any other advantageous combination of heat exchangers prior to final discharge to atmosphere.

DESCRIPTION OF THE PREFERRED EMBODIMENT

A combustion gas, after extraction from a boiler and thorough particulate removal, is adjusted as necessary to have the approximate composition of the previously described coal combustion gas at 850 K. It is then scrubbed at atmospheric pressure in multiple scrubbing stages by countercurrent contact with molten alkali salt having a cation composition of 50% $K^+$, 30% $Li^+$, 20% $Na^a$. The scrub removes at least 80% of the sulfur compounds in the gas. The cleaned gas is then injected with stoichiometric air for complete combustion into an alkali-carbonate-sulfate melt comprised predominantly of sodium plus potassium cations. The hot clean exhaust gas exiting from the salt combustor is heat exchanged and then discharged to atmosphere. In the combined scrubbing and regeneration system, the regenerator pressure, number of scrub and regeneration stages, $CO_2$ content of regeneration gas, and salt circulation rate are all jointly fixed at advantageous values to yield an overall regeneration gas requirement of approximately 6 moles regeneration gas per mole $H_2S$ scrubbed. Thus the $H_2S$ content of the exhaust regeneration gas is 20%, and it increases to approximately 65% when $H_2O$ is condensed out. The table below illustrates the regeneration gas requirement (moles regeneration gas per mole $H_2S$ scrubbed) for various combinations of the above factors. The salt circulation rate is indicated as moles salt circulated per mole of combustion gas scrubbed (L/G). The benefits from varying each parameter individually are ascertainable from the data. The first six runs reflect single stage conditions. Runs 1 and 2 show that with atmospheric regeneration even with voluminous salt circulation rates the regeneration efficiency is unacceptable. Runs 2, 3, and 5 show the effect of increasing regeneration pressure: doubling the pressure virtually doubles the regeneration efficiency. Runs 3, 5, and 6 show how extra regeneration pressure can compensate for reduced regeneration $CO_2$. Runs 7 through 11 all have 2 equilibrium stages in both scrubber and regenerator. The same patterns as were evident in the single stage runs are also evident here, except that markedly lower salt circulation rates are required (due to the larger sulfide loadings) and also somewhat higher overall regeneration efficiencies are attainable. Run 12 reflects the particularly preferred embodiment of more regeneration stages than scrub stages, and illustrates the very high regeneration efficiencies attainable at low salt flows and low $CO_2$ percentages.

| | EQUIL. STAGES | | REGEN | REGEN | | EXIT SALT ANION COMP. (%) | | | | REGEN REQ'T |
| | | | | | | SCRUB | | REGEN) | | |
| RUN | SCRUB | REGEN | $CO_2$ (%) | PRES | L/G | $S^=$ | $OH^-$ | $S^=$ | $OH^=$ | MOL/MOL |
| --- | --- | --- | --- | --- | --- | --- | --- | --- | --- | --- |
| 1 | 1 | 1 | 20 | 1 | 2 | 2.9 | .25 | 2.7 | 0.8 | 92.4 |
| 2 | 1 | 1 | 20 | 1 | .5 | 2.9 | .25 | 2.2 | 0.8 | 113.9 |
| 3 | 1 | 1 | 20 | 10 | .5 | 2.9 | .25 | 2.2 | 0.8 | 14.2 |
| 4 | 1 | 1 | 20 | 20 | .1 | 2.9 | .25 | 0.2 | 0.8 | 61.0 |

-continued

| | EQUIL. STAGES | | REGEN | REGEN | | EXIT SALT ANION COMP. (%) | | | | REGEN REQ'T |
| | | | | | | SCRUB | | REGEN) | | |
| RUN | SCRUB | REGEN | $CO_2$ (%) | PRES | L/G | $S^=$ | $OH^-$ | $S^=$ | $OH^=$ | MOL/MOL |
|---|---|---|---|---|---|---|---|---|---|---|
| 5 | 1 | 1 | 20 | 20 | .5 | 2.9 | .25 | 2.2 | 0.8 | 8.6 |
| 6 | 1 | 1 | 40 | 10 | .5 | 2.9 | .25 | 2.2 | 0.5 | 10.3 |
| 7 | 2 | 2 | 20 | 1 | .1 | 4.8 | .2 | 2.3 | 1.0 | 93.0 |
| 8 | 2 | 2 | 20 | 1 | .05 | 6.2 | .2 | 1.3 | 0.9 | 96.6 |
| 9 | 2 | 2 | 20 | 10 | .1 | 4.8 | .2 | 2.3 | 1.0 | 11.0 |
| 10 | 2 | 2 | 20 | 10 | .05 | 6.2 | .2 | 1.3 | 0.9 | 11.4 |
| 11 | 2 | 2 | 20 | 20 | .05 | 6.2 | .2 | 1.3 | 0.9 | 6.7 |
| 12 | 2 | 5 | 10 | 20 | .05 | 6.2 | .2 | 1.3 | 0.8 | 5.2 |

The tabulated data clearly show within experimental error that numerous configurations will evidence advantageous values of regeneration gas requirement.

I claim:

1. In a regenerative process for removing $H_2S$, COS, and $SO_2$ from a sulfur-containing hot combustion gas which comprises:
   a. scrubbing the combustion gas by contacting it with a molten alkali salt mixture;
   b. regenerating the molten salt by contacting it with steam plus $CO_2$;
   the improvement which comprises:
   (i) establishing the quality of the combustion gas in the approximate range of 2% to 20% for the scrubbing contacting action;
   (ii) maintaining the scrubbing salt temperature in the approximate range of 800 K to 950 K;
   (iii) establishing the alkali cation composition of the salt such that is consists essentially of 40±20% potassium cations, 35±25% lithium cations, and balance sodium cations;
   (iv) conducting the scrubbing contact within the approximate pressure range of 0.5 to 4 atmospheres;
   (v) increasing the salt pressure for regeneration to within the approximate range of 2 times scrub pressure to 60 times scrub pressure.

2. The process according to claim 1 wherein the scrubbing and regeneration contacting actions are both conducted in multiple countercurrent stages.

3. The process according to claim 2 comprising the additional step of completing the combustion of the desulfurized combustion gas by oxidizing it with air.

4. The process according to claim 3 wherein the alkali cation composition is 50±10% $K^+$, 30±10% $Li^+$, and balance $Na^+$.

5. The process according to claim 4 wherein the combustion gas quality is approximately 4 to 8%, the scrub temperature is approximately 850 K, and scrub pressure is approximately atmospheric, the regeneration pressure is within the range of 5 to 30 atmospheres, and comprising the additional step of removing particulate matter from the sulfur-containing hot combustion gas prior to the scrubbing contacting step.

6. The process according to claim 3 comprising the additional step of establishing the combustion gas quality in the stated range by injecting fuel gas into it.

7. The process according to claim 3 comprising the additional step of establishing the combustion gas quality in the staged range by supplying less than stoichiometric air to the combustion gas generator.

8. The process according to claim 3 wherein the desulfurized combustion gas is oxidized with air by injecting both the gas and the air into contact with a molten alkali salt containing sulfate anions and containing no more than trace amounts of sulfide anions.

9. The process according to claim 3 comprising the additional step of raising the temperature of the sulfur-containing combustion gas to the approximate temperature of the scrubber prior to the scrubbing contact step.

10. A process for regeneratively scrubbing hydrogen sulfide from a hot sulfur-containing combustion gas having a quality of at least 2% which comprises:
    a. scrubbing the combustion gas with a molten alkali salt consisting essentially of carbonate, sulfide, and hydroxide anions;
    b. increasing the salt pressure to at least two times the scrubbing pressure;
    c. regenerating the salt at the higher pressure by contacting it with steam optionally admixed with $CO_2$;
    d. decreasing the pressure of the salt for reuse in the scrubbing step.

11. The process according to claim 10 wherein the combustion gas quality is in the range 2 to 20%, the scrubbing and regeneration temperatures are in the range 800 to 950 K, the scrubbing pressure is in the range 0.5 to 4 atmospheres, and the salt alkali cation composition consists essentially of 20 to 60% potassium, 10 to 60% lithium, balance sodium cations.

* * * * *